United States Patent [19]
Peters

[11] 3,762,494
[45] Oct. 2, 1973

[54] VEHICLE INERTIA SENSOR
[75] Inventor: Theodore F. Peters, Utica, Mich.
[73] Assignee: General Motors Corporation, Detroit, Mich.
[22] Filed: Mar. 1, 1971
[21] Appl. No.: 122,575

[52] U.S. Cl............................ 180/103, 200/61.45 R
[51] Int. Cl............................................. B60r 21/00
[58] Field of Search...................... 200/61.45, 61.48, 200/61.5, 61.51; 180/103, 104, 82; 73/71.2

[56] References Cited
UNITED STATES PATENTS

| | | | |
|---|---|---|---|
| 3,641,290 | 2/1972 | Murphy et al. | 200/61.45 R |
| 3,654,410 | 4/1972 | Miller | 200/61.45 R |
| 2,618,712 | 11/1952 | Moledzky | 200/61.51 |
| 2,406,427 | 8/1946 | Leonard | 200/61.5 |
| 2,802,204 | 8/1957 | Kennelly et al. | 200/61.45 R X |
| 2,783,321 | 2/1957 | Richardson | 200/61.45 R |
| 3,389,607 | 6/1968 | Kishel | 200/61.45 R X |

*Primary Examiner*—Kenneth H. Betts
*Attorney*—W. E. Finken and Herbert Furman

[57] ABSTRACT

A sensor includes a housing mounted on a vehicle body for swinging movement about a vertically disposed pin. A coiled torsion spring mounted on the pin normally locates the housing in a predetermined position with respect to the supporting body structure. Mounted within the housing are a pair of normally closed switch contacts. A lever swingably mounted within the housing for movement about a generally horizontally disposed axis adjacent its lower end mounts a weight adjacent its upper end. A permanent magnet normally locates the lever in a predetermined position in engagement with an insulating abutment on one of the switch contacts to maintain the switch in open position. When an acceleration pulse of predetermined amplitude and time is received, the housing moves about the pin until it is oriented or aligned with the general direction of such pulse. Upon orientation being achieved, the weight on the lever moves the lever out of engagement with the magnet and against the force of the magnetic flux so that the lever moves out of engagement with the abutment of the one contact and permits the contacts to close.

3 Claims, 2 Drawing Figures

PATENTED OCT 2 1973  3,762,494

INVENTOR.
Theodore F. Peters
BY
Herbert Furman
ATTORNEY

3,762,494

VEHICLE INERTIA SENSOR

This invention relates generally to sensors and more particularly to a sensor having an inertially actuated switch requiring a particular orientation with respect to the direction of an acceleration pulse of predetermined amplitude and time for actuation.

The sensor of this invention is particularly intended for use with a conventional vehicle body occupant restraint system of the type wherein release of pressure fluid for inflation of an inflatable occupant restraint cushion is controlled by a sensor actuated when an acceleration pulse of predetermined amplitude and time is received by the body.

The sensor of this invention includes an inertially actuated switch controlling release of the pressure fluid. The switch cannot be actuated unless it is oriented in a particular direction with respect to the general direction of the pulse and the pulse is of sufficient amplitude and time.

In the preferred embodiment of the invention, a switch housing is swingably mounted on the body for movement about a vertical axis and normally located in a predetermined position by a resilient bias such that movement of the housing from this position requires an acceleration pulse of predetermined amplitude and time. Mounted within the housing are a pair of normally closed switch contacts, controlled by a weighted lever moving against the flux of a permanent magnet when a pulse of predetermined amplitude and time is received by the lever. The movement of the lever under the pulse received thereby requires that the housing be oriented in the general direction of the pulse. The pulse required to move the lever may be the same or different than the pulse required to orient the housing.

The primary object of this invention is to provide a sensor having an inertially actuated switch, actuation of which is dependent upon a particular orientation of the switch with respect to the general direction of an acceleration pulse of predetermined amplitude and time.

This and other objects of the sensor of this invention will be readily apparent from the following specification and drawings wherein.

Figure 1:
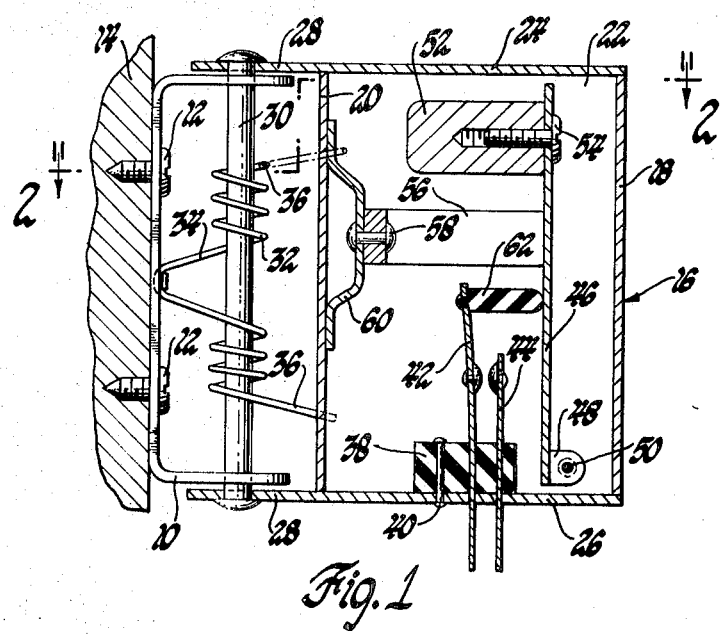
FIG. 1 is a sectional view of a sensor according to this invention in unactuated position.

Referring now particularly to the drawings, a U-shaped support bracket 10 is screwed at 12 to a portion 14 of a vehicle body, such as the firewall or toe board thereof. A vertically elongated housing 16 of generally rectangular cross section includes end walls 18 and 20 formed integral with side walls 22. The upper and lower walls 24 and 26, respectively, of the housing are formed separately and welded to the side and end walls after assembly to provide a closed housing. Aligned apertured ears 28 of the upper and lower walls receive a double headed pin 30 therethrough. The pin 30 also extends through aligned openings in the legs of the bracket 10 and defines a generally vertically disposed axis of swinging movement of the housing 16. A double coil torsion spring 32 surrounds the pin 30 and has the bight portion 34 thereof anchored to a lanced tab of the bracket 10, and the legs 36 thereof engaging opposite side walls 22 of the housing 16, FIG. 2, to normally locate the housing as shown and resiliently resist swinging movement thereof.

A block 38 of insulating material is riveted at 40 to the lower wall 26 of housing 16 and supports a pair, 42 and 44, of leaf-type spring contacts. The contacts extend outwardly of wall 26 through openings therein for connection across a suitable source of power such as the vehicle battery. The contacts 42 and 44 are biased so as to be closed to each other.

A lever 46 includes a pair of integral apertured ears 48 adjacent its lower end which swingably receive a pin 50 extending between the side walls 22 of housing 16. The lever carries a mass 52 of predetermined weight adjacent its upper end. Although not shown in the drawings, it is believed obvious that the lever may be provided with a number of additional openings for the screw 54 which secures the weight 52 thereto in order to provide for setting of the weight at various positions along the length of the lever. A U-shaped permanent magnet 56 has its bight riveted at 58 to an offset bracket 60 which is welded to the forward wall 20 of housing 16. Normally the flux of magnet 56 holds the lever 46 in its normal or unactuated position as shown. The contact 42 is slightly longer than the contact 44 and mounts an abutment 62 of insulating material which engages the lever 46 so as to hold the contacts 42 and 44 in open position as shown.

When an acceleration pulse of predetermined amplitude and time is received by the body structure 14, the housing 16 will swing about the pin 30 and against the bias of the spring 32 to an actuated position wherein the longitudinal axis of the housing becomes coplanar with the axis of the pin and the direction of such pulse. Thereupon it will be noted that the axis of swinging movement of the lever 46 will be normal to the pulse direction and, if the lever and its associated weight 52 are set so as to inertially move upon receipt of a pulse of such amplitude and time, the lever 46 will swing slightly clockwise about pin 50 to permit the contacts 42 and 44 to close. The amplitude and time of the pulse which is required to orient the housing 16 with respect to the direction of receipt of such pulse may be the same as the amplitude and time of the pulse required for the lever 46 and the weight 52 to swing slightly clockwise against the flux of magnet 56 or may be different.

Figure 2:
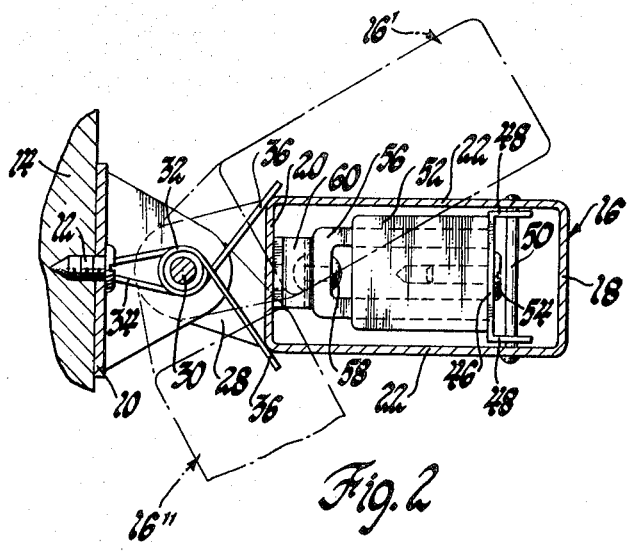
FIG. 2 is a sectional view taken generally along the plane indicated by the line 2—2 of FIG. 1 and further showing various other positions of the sensor in phantom lines.

FIG. 2 schematically indicates two possible actuated positions 16' and 16" of the housing 16 relative to the pin 30. The housing 16 is limited to movement through an arc of approximately 180° relative to the pin.

Thus, this invention provides an improved sensor.

I claim

1. In combination with a vehicle having a source of power, a sensor comprising, support means, means mounting the support means on the vehicle for inertial movement about an axis from a normal position to another position, means locating the support means in normal position and resisting movement thereof to said another position unless the support means is subjected to a pulse of predetermined amplitude and time resulting from impact forces applied to the vehicle, switch means mounted on the support means for movement therewith, inertial actuated means mounted on the support means for movement therewith about the first axis and movement relative thereto about a second axis transverse of the first axis for connecting the switch means across the source of power upon movement of the support means to said another position, and means resisting movement of the inertial actuated means about the second axis unless the pulse is of predetermined amplitude and time when the support means is in said another position.

2. In combination with a vehicle having a source of power, a sensor comprising, support means, means mounting the support means on the vehicle for inertial movement about an axis from a normal position to another position, means locating the support means in normal position and resisting movement thereof to said another position unless the support means is subjected to a pulse of predetermined amplitude and time resulting from impact forces applied to the vehicle, switch means connectable across the source of power, means mounting the switch means on the support means for movement therewith, inertial actuated means mounted on the support means for movement therewith about the first axis and movement relative thereto about a second axis transverse of the first axis, means resisting movement of the inertial actuated means about the second axis unless the pulse is of predetermined amplitude and time when the support means is in said another position, and cooperating means on the switch means and inertial actuated means for disconnecting the switch means from the source of power when the inertial actuated means moves with the support means and for connecting the switch means across the source of power when the inertial actuated means moves relative to the support means.

3. In combination with a vehicle having a source of power, a sensor comprising, support means, means mounting the support means on the vehicle for inertial movement about an axis from a normal position to another position, means locating the support means in normal position and resisting movement thereof to said another position unless the support means is subjected to a pulse of predetermined amplitude and time resulting from impact forces applied to the vehicle, switch means mounted on the support means for movement therewith, inertial actuated lever means swingably mounted on the support means for movement relative thereto about a pivotal axis transverse of the first axis, means normally resisting movement of the lever means about the pivotal axis thereof unless the pulse is of predetermined amplitude and time when the support means is in said another position, and means for connecting the switch means across the source of power upon movement of the lever means about the pivotal axis thereof.

* * * * *